United States Patent [19]

Lee

[11] Patent Number: 5,526,049
[45] Date of Patent: Jun. 11, 1996

[54] CIRCUIT FOR AUTOMATICALLY FOCUSING A CAMERA BASED ON CHANGES IN LUMINANCE SIGNALS DERIVED FROM OPTICAL SIGNALS RECEIVED BY THE CAMERA

[75] Inventor: Jae S. Lee, Inchon, Rep. of Korea

[73] Assignee: Samsung Electronics Co., Ltd., Kyungki-do, Rep. of Korea

[21] Appl. No.: 351,047

[22] Filed: Nov. 28, 1994

Related U.S. Application Data

[63] Continuation of Ser. No. 24,028, Mar. 1, 1993, abandoned.

[30] Foreign Application Priority Data

Feb. 29, 1992 [KR] Rep. of Korea .................. 92-3389

[51] Int. Cl.[6] .................................................. H04N 5/232
[52] U.S. Cl. .......................................... 348/354; 348/355
[58] Field of Search .................................. 348/345, 346, 348/349, 350, 351, 354, 356, 355; 354/400, 402; H04N 5/232

[56] References Cited

U.S. PATENT DOCUMENTS

| | | | |
|---|---|---|---|
| 4,544,953 | 10/1985 | Goldman | 358/227 |
| 4,614,975 | 9/1986 | Kaito | 358/227 |
| 4,922,346 | 5/1990 | Hidaka et al. | 358/227 |
| 4,967,280 | 10/1990 | Takuma et al. | 358/227 |
| 4,980,773 | 12/1990 | Suda et al. | 358/227 |
| 5,005,086 | 4/1991 | Iwamoto et al. | 358/227 |
| 5,115,262 | 5/1992 | Komiya | 354/402 |
| 5,150,217 | 9/1992 | Senuma et al. | 358/227 |
| 5,187,585 | 2/1993 | Kaneda et al. | 358/227 |
| 5,212,516 | 5/1993 | Yamada et al. | 358/227 |

*Primary Examiner*—Michael T. Razavi
*Assistant Examiner*—Tuan Y. Ho
*Attorney, Agent, or Firm*—Sughrue, Mion, Zinn, Macpeak & Seas

[57] ABSTRACT

An automatic focus circuit for use with a video camera comprises an analog to digital converter which converts an analog luminance signal provided from an image signal processing circuit into a digital luminance signal, a microcomputer for controlling the automatic focus unit using an integrated luminance value which is integrated in an integrating circuit, and an area dividing circuit for horizontally and vertically dividing a screen of a video camera monitor. The automatic focus operation is easily performed by using the integrated digital luminance value as stored in a memory circuit. Accordingly, the automatic focus circuit simplifies the constitution and accuracy of the automatic focus.

5 Claims, 4 Drawing Sheets

CIRCUIT FOR AUTOMATICALLY FOCUSING A CAMERA BASED ON CHANGES IN LUMINANCE SIGNALS DERIVED FROM OPTICAL SIGNALS RECEIVED BY THE CAMERA

This is a continuation of application Ser. No. 08/024,028 filed Mar. 1, 1993, now abandoned.

BACKGROUND OF THE INVENTION

Applicant incorporates by reference herein the contents of Korean patent application No. 92-3389 filed Feb. 29, 1992.

The present invention relates to an automatic focus circuit used in a video camera, and more particularly to an automatic focus circuit for performing automatic focus by evaluating integrated values of digital luminance signals for a divided area on the monitor screen.

There are two basic types of conventional automatic focus apparatus used in a video camera, for example, the infrared ray type and the Honeywell type developed by the Honeywell Company.

Both the infrared ray type automatic focus apparatus and the Honeywell type automatic focus apparatus largely employ a mechanical system except for the electrical circuit, such as a comparator 2 and a controller 1. FIG. 1 is a diagram schematically showing an example of an automatic focus apparatus in accordance with the conventional system.

As shown in FIG. 1, a light emitting device emits infrared rays to an object, and a receiving sensor 5 receives an optical signal from a reflecting prism 4 which receives the optical signal through a fixed mirror 2 and an injection mirror 3. A microcomputer 7 makes a computation utilizing an electrical signal compared in comparing circuit 6 and provides a control signal for automatic focus to an automatic focus motor 8 which is mounted at a lower portion of the body of photographing lens 9.

The conventional automatic focus apparatuses have a complicated constitution and have difficulty in performing automatic focusing.

SUMMARY OF THE INVENTION

It is an object of the present invention to provide an automatic focus circuit, with a simple constitution, for performing automatic focus by evaluating the integrated value of a digital luminance signal which is converted to a digital signal by an appropriate analog to digital converter (hereinafter referred to as an "A/D converter").

To achieve the foregoing object, an automatic focus circuit according to the present invention comprises: an area dividing circuit for dividing the screen of the monitor by using clock signals provided from a clock signal generator 60 and a vertical blanking signal generator 61 which respectively generate a vertical driving signal and a predetermined frequency clock signal; a band pass filter for filtering a desired frequency bandwidth of an analog luminance signal; an A/D converter for converting the analog luminance signal provided from the band pass filter into a digital luminance signal; a memory for storing digital luminance signals supplied from the A/D converter and providing the digital luminance signal stored therein when one field is finished; a microcomputer for providing the memory and the area dividing circuit with a control signal in response to a system program stored therein and ultimately controlling an automatic focus motor, the microcomputer connecting an interface unit for converting a parallel form signal to a serial form signal.

DETAILED DESCRIPTION OF THE PREFERRED EMBODIMENT

Figure 1:
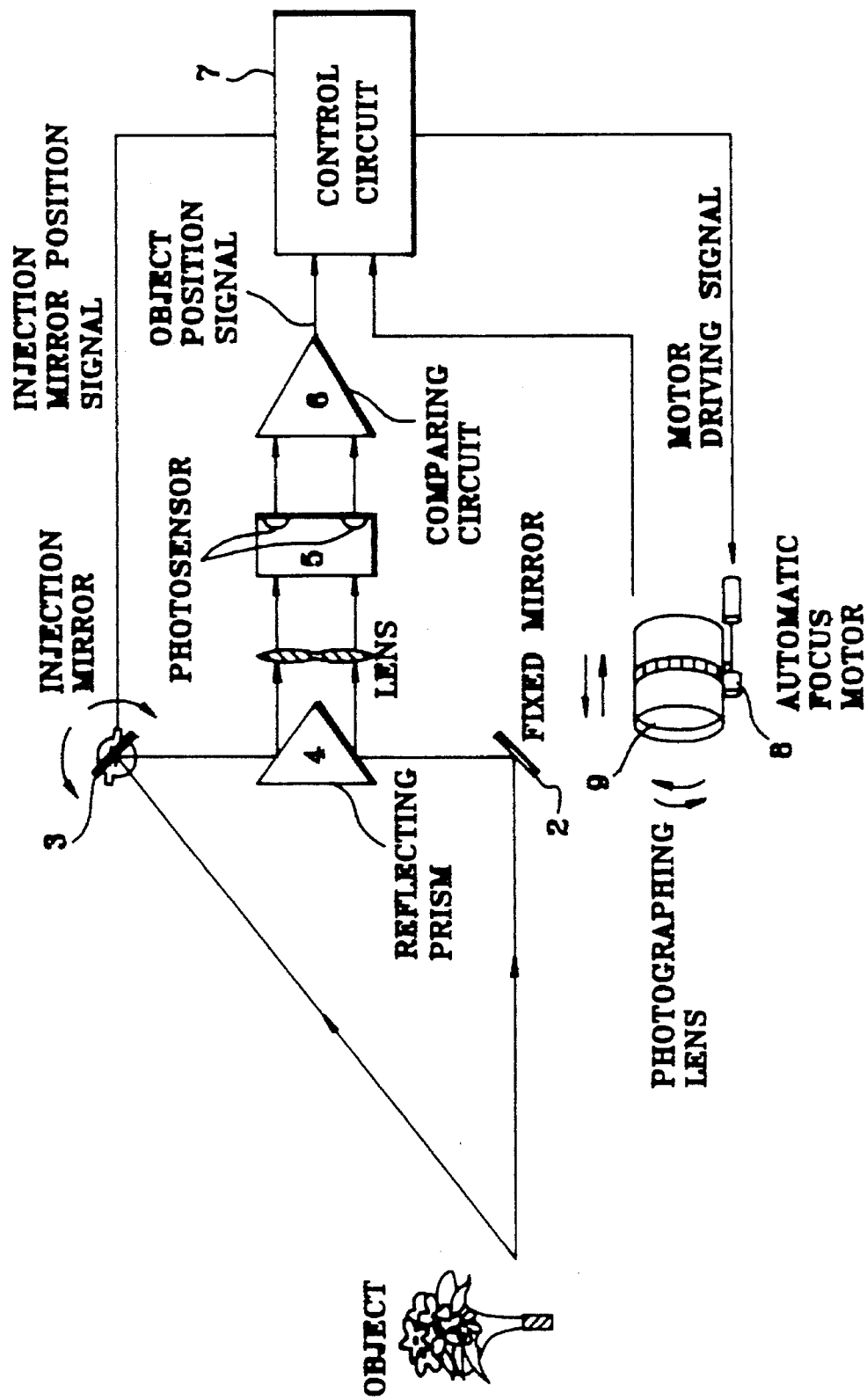
FIG. 1 is a diagram schematically showing an example of a conventional automatic focus apparatus.
Figure 2:
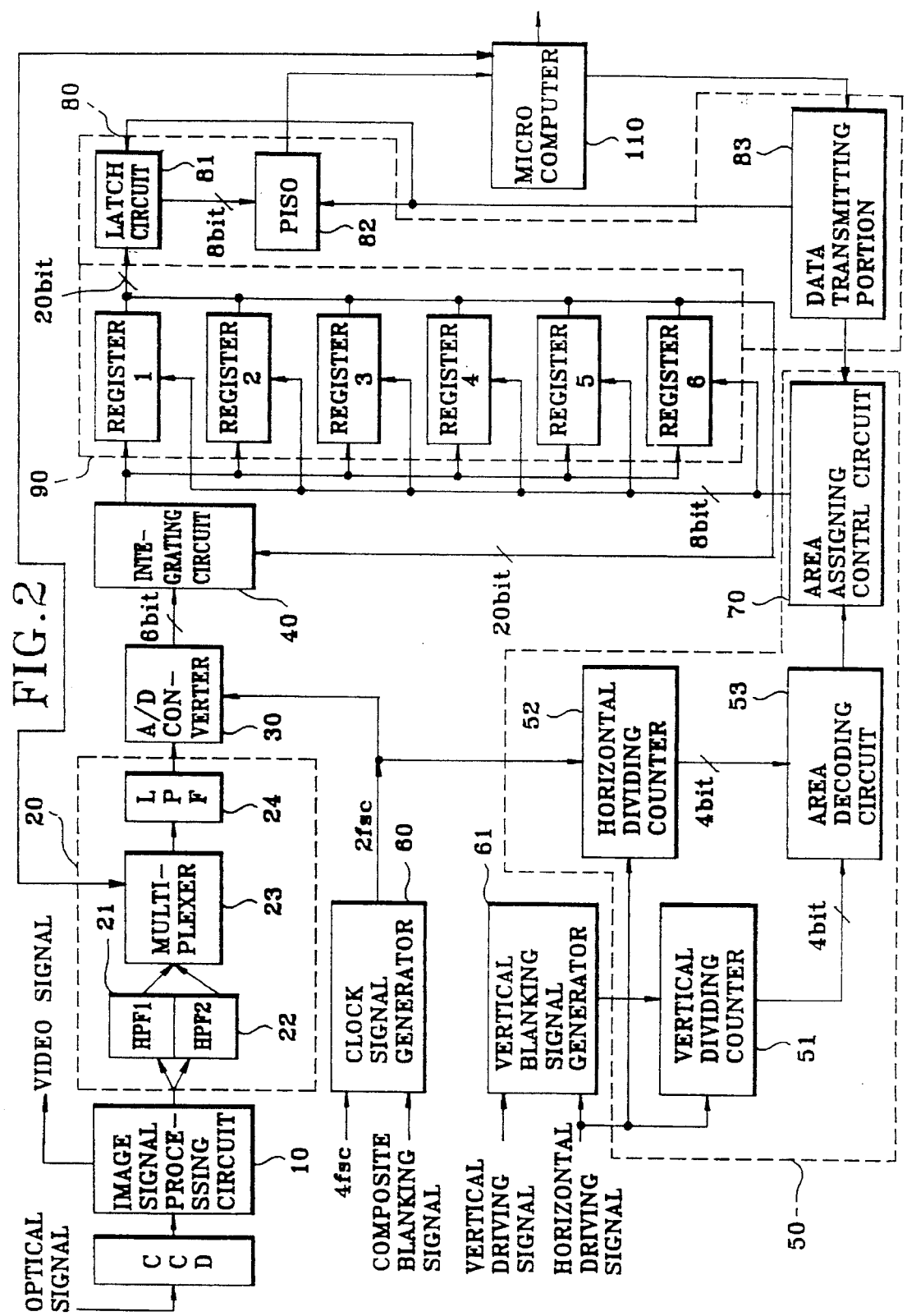
FIG. 2 is a block diagram showing an embodiment of an automatic focus circuit for use with a video camera according to the present invention.

FIG. 2 is a block diagram showing an embodiment of an automatic focus circuit for use with a video camera according to the present invention.

As shown in FIG. 2, an image signal processing circuit 10 which separates a luminance signal from the output signal of the charge coupled device for converting an optical signal to an electrical signal is connected to high pass filters 21 and 22 which pass a desired bandwidth frequency spectrum. A multiplexer 23 which performs multiplexing is connected to the high pass filters 21 and 22 in order to receive the output signal of one of them, and the multiplexed signal from the multiplexer 23 is fed to a low pass filter 24 which passes a low bandwidth frequency spectrum.

Figure 3:
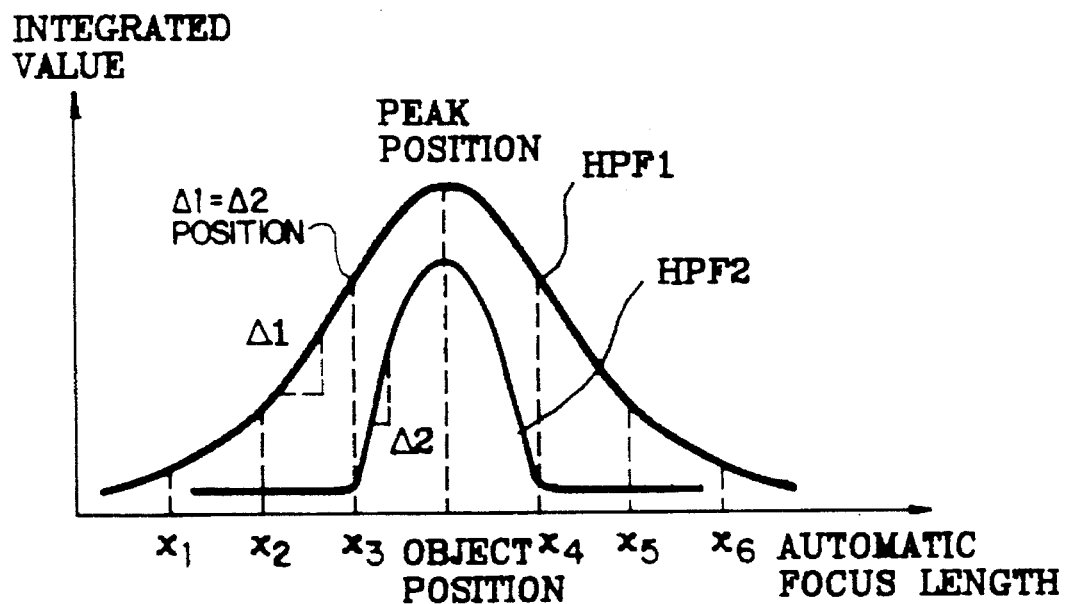
FIG. 3 is a graph showing characteristics of the high pass filters of the present invention.

FIG. 3 is a graph showing the characteristics of the high pass filters according to the present invention.

As described later with reference to FIG. 5, the high pass filter 21 is initially operated in order to enhance the automatic focusing speed until the position $X_3$ (see FIG. 3) where delta value $\Delta_1$ (i.e., integrated value/length of automatic focus) of the high pass filter 21 is smaller than delta value $\Delta_2$ of the high pass filter 22.

Therefore, the luminance signal passing through the high pass filters 21 and 22, a multiplexer 23, and a low pass filter 24 has in effect passed through a band pass filter.

On the other hand, an A/D converter 30 is connected to the low pass filter 24 in order to convert the analog luminance signal to a digital luminance signal, and to a clock signal generator so as to respond to the output signal at 2 fsc (i.e., 2X the sub-carrier frequency). The output signal of a vertical blanking signal generator for generating a vertical blanking signal, acting as a vertical retrace eliminating signal, is supplied to a vertical dividing counter in area dividing portion 50.

The output signals of the vertical dividing counter 51 and a horizontal dividing counter 52 are respectively supplied to area decoding circuit 53.

Figure 4:
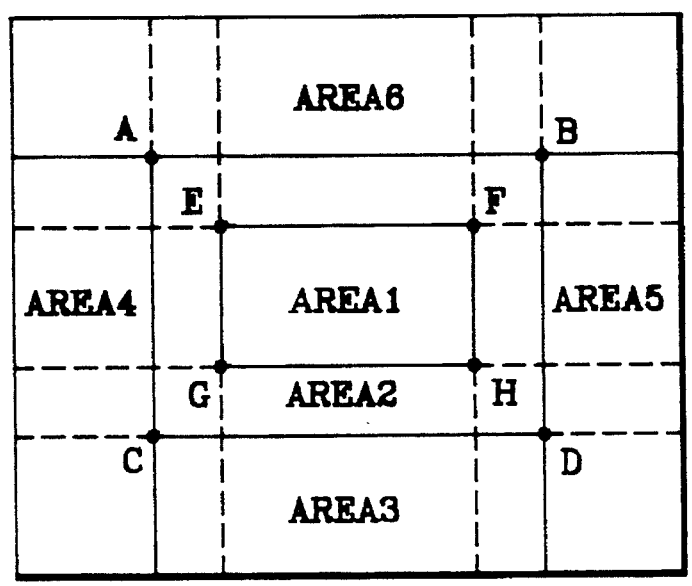
FIG. 4 is a diagram showing six areas divided by an area dividing circuit on the screen of a video camera.

FIG. 4 is diagram showing six areas as divided by the area decoding circuit on a screen of a video camera.

As shown in FIG. 4, the outputs of the vertical dividing counter and the horizontal dividing counter are decoded in the area decoding circuit so that the crossing points A to H are determined. Referring again to FIG. 2, the output signal of the A/D converter 30 is supplied to an integrating circuit 40 in which the integrating is performed. In this embodiment, the integrating circuit 40 uses a 20 bit full adder.

The data integrated in the integrating circuit 40 is stored in a memory circuit 90 shown in FIG. 2 and is again returned to the integrating circuit 40 so as to be added to the next data provided from A/D converter 30.

When one video field is completed, the integrated data is loaded in latch circuit 81 and is transmitted to a parallel-in-serial-out circuit (PISO) 82 in response to a control signal from microcomputer 110 connected to a data transmitting portion 83, during the vertical blanking period.

Area assigning control circuit 70 connected to the area decoding circuit 53 in the area dividing circuit 50 controls storage of the integrated luminance values into the corresponding registers of the memory circuit 90 in response to a control signal from the microcomputer 110.

Figure 5:
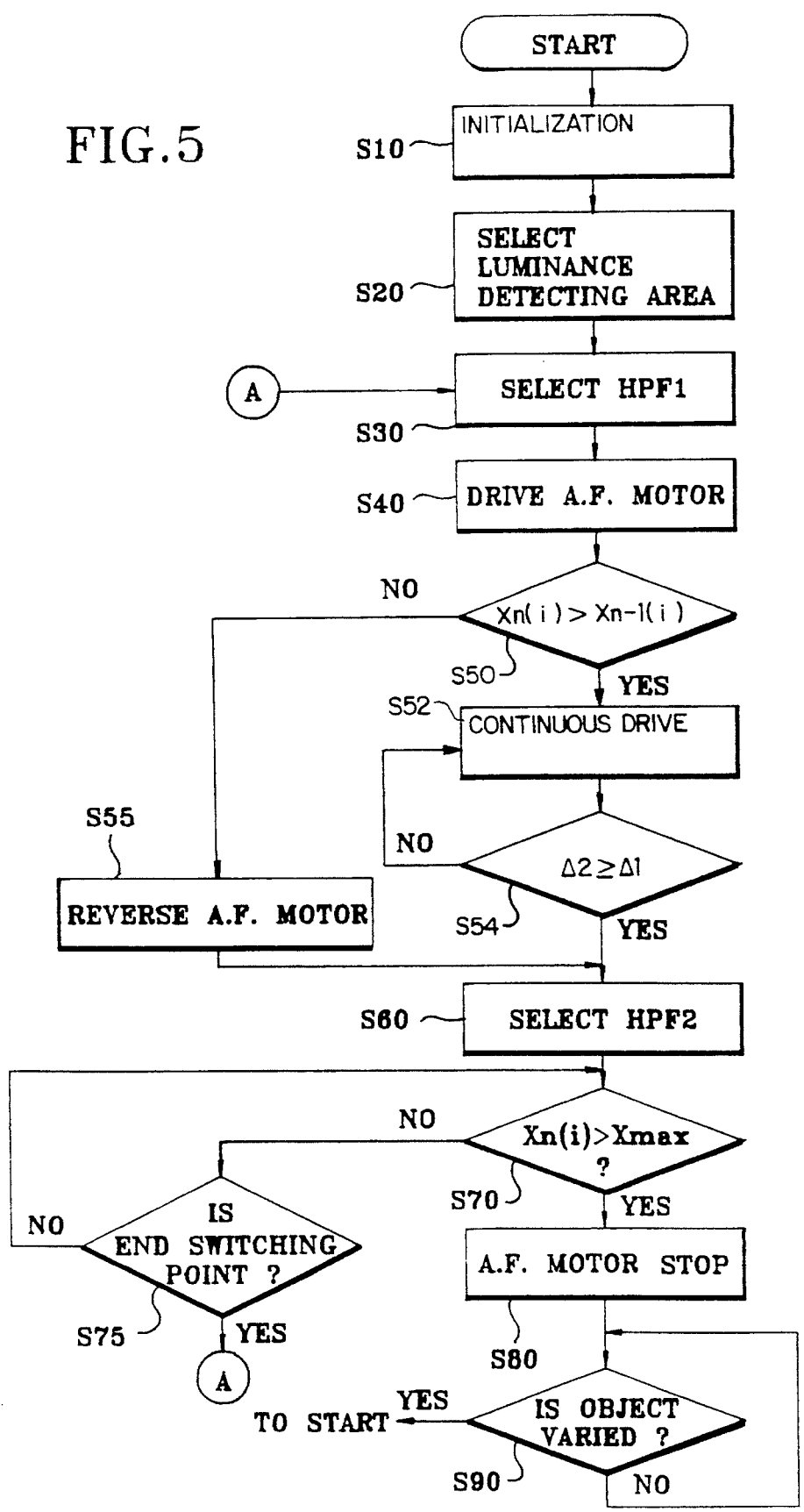
FIG. 5 is a flow chart explaining the control operation of a microcomputer for performing automatic focus according to the present invention.

FIG. 5 is a flow chart explaining the control operation of the microcomputer for performing automatic focus according to the present invention. As shown in FIG. 5, step 10 is an initializing step which moves the automatic focus unit forward or backward to a start point. In step 20, a luminance detection area is selected. As an example, areas 1 and 2 (the center area) shown in FIG. 4 are selected. In step 30, HPF1 21 is selected and the automatic focus motor is driven in step 40. In step 50, the moving direction of the automatic focus unit is determined depending upon the integrated value.

This will be explained as follows. Assuming that Xn(i)>Xn−1(i) is given as shown in FIG. 3, the automatic focus motor is moved in the forward direction. If Xn(i)<Xn−1(i), the automatic focus motor is moved in the opposite direction (step 55).

Prior to step 60, in step 52, HPF1 21 is operated until position $X_3$ is reached (where $\Delta 2$ becomes equal to or greater than $\Delta 1$ (see FIG. 3)) and the HPF2 22 is then operated in order to find a high density luminance position as explained above. Step 70 judges whether the integrated data value has peaked or not. If so, the movement of the motor stops (step 80). If not, step 75 determines whether an end switching (reversal) is to be performed or not.

In step 75, if end switching is to be performed, operation returns to step 30. Otherwise, step 70 is again performed. If the peak value is reached, the movement of the motor is stopped (step 80). Step 90 judges whether the position of the object has been changed. If so, the program is returned to the start.

The automatic focus circuit according to the present invention can perform not only automatic focus but also automatic iris control in the video camera, and provides accurate focusing with a simple construction.

While particular embodiments of the invention have been shown and described, it will be obvious to those skilled in the art that changes and modifications may be made without departing from the invention in its broader aspects and, therefore, the aim in the appended claims is to cover all such changes and modifications as fall within the true spirit and scope of the invention.

What is claimed is:

1. An automatic focus circuit for use with a video camera comprising an automatic focus motor and a monitor having a screen, comprising:

a microcomputer;

an area dividing circuit for dividing the screen of the monitor into plural areas, selecting an area to be evaluated as designated by said microcomputer, and providing a control signal;

a band pass filter comprising first and second high pass filters for filtering first and second desired frequency bandwidths, respectively, of an analog luminance signal in said selected area and providing first and second filtered signals, respectively, said band pass filter providing, at different times, one of first and second frequency bandwidth analog luminance signals based on one of said first and second filtered signals, respectively;

an A/D converter for converting said first and second frequency bandwidth analog luminance signals provided from said band pass filter into first and second digital luminance signals, respectively; and a first circuit for, during a video field period and in accordance with said control signal, integrating one of said first and second digital luminance signals to provide one of first and second integrated digital luminance signals, respectively, and storing one of said first and second integrated digital luminance signals supplied from said A/D converter, and for outputting said one of said first and second integrated digital luminance signals stored therein when said video field period is complete;

wherein said microcomputer:

compares said first and second filtered signals to determine whether said first filtered signal, when integrated, provides said first integrated signal having a first integrated signal value which increases faster than a second integrated signal value of said second integrated signal, and vice versa, controls said band pass filter to output said first frequency bandwidth analog luminance signal during a first period when determining that said first frequency bandwidth analog luminance signal, when integrated, provides said first integrated signal having said first integrated signal value which increases faster than second integrated signal value, controls said band pass filter to output said second frequency bandwidth analog luminance signal during a second period when determining that said second frequency bandwidth analog luminance signal, when integrated, provides said second integrated signal having said second integrated signal value which increases faster than said first integrated signal value, controls said area dividing circuit to provide said control signal, and controls said automatic focus motor in response to said one of said first and second stored integrated digital luminance signals output by said first circuit.

2. The automatic focus circuit according to claim 1, wherein said area dividing circuit comprises an area decoding circuit connected to a vertical dividing count circuit and a horizontal dividing count circuit which provide predetermined vertical and horizontal dividing line signals thereto, respectively, for dividing the screen of the monitor into said plural areas.

3. The automatic focus circuit according to claim 1, wherein said first circuit comprises registers for respectively storing said one of said first and second integrated digital luminance signals in response to said second control signal.

4. The automatic focus circuit according to claim 2, wherein said area dividing circuit further comprises an area assigning control circuit, coupled to said area decoding circuit, for providing said second control signal to said first circuit.

5. The automatic focus circuit according to claim 1, wherein said band pass filter further comprises a multiplexer coupled to outputs of said high pass filters, and a low pass filter connected to the output of said multiplexer.

* * * * *